(12) United States Patent
Kao et al.

(10) Patent No.: US 9,705,847 B2
(45) Date of Patent: Jul. 11, 2017

(54) MANAGEMENT SERVER AND MANAGEMENT METHOD THEREOF FOR MANAGING CLOUD APPLIANCES IN VIRTUAL LOCAL AREA NETWORKS

(71) Applicant: Institute For Information Industry, Taipei (TW)

(72) Inventors: Chung-Ting Kao, Taipei (TW); Yu-Jung Cheng, Taichung (TW)

(73) Assignee: Institute For Information Industry, Taipei (TW)

( * ) Notice: Subject to any disclaimer, the term of this patent is extended or adjusted under 35 U.S.C. 154(b) by 283 days.

(21) Appl. No.: 14/079,340

(22) Filed: Nov. 13, 2013

(65) Prior Publication Data

US 2015/0131674 A1 May 14, 2015

(51) Int. Cl.
*H04L 29/12* (2006.01)
*H04L 12/46* (2006.01)

(52) U.S. Cl.
CPC ...... *H04L 61/2596* (2013.01); *H04L 12/4641* (2013.01); *H04L 61/6022* (2013.01)

(58) Field of Classification Search
None
See application file for complete search history.

(56) References Cited

U.S. PATENT DOCUMENTS 8,194,674 B1 * 6/2012 Pagel ................. H04L 12/4641 370/393
8,934,116 B2 * 1/2015 Umekage ............ H04L 12/4641 358/1.13
2003/0009697 A1 * 1/2003 Uehata et al. ................ 713/201
2005/0111455 A1 * 5/2005 Nozue et al. ................. 370/392
2005/0190775 A1 * 9/2005 Tonnby et al. ............... 370/401
2007/0081541 A1   4/2007 Umekage et al.
2009/0126003 A1 * 5/2009 Touboul ........................ 726/13
2012/0131162 A1 * 5/2012 Brandt et al. ................ 709/223

FOREIGN PATENT DOCUMENTS

JP 2005101722 A 4/2005
JP 2006128803 A 5/2006

OTHER PUBLICATIONS

Office Action to the corresponding Japanese Patent Application rendered by the Japan Patent Office on Dec. 22, 2014, 7 pages (including English translation).

* cited by examiner

*Primary Examiner* — Hassan Phillips
*Assistant Examiner* — Saba Tsegaye
(74) *Attorney, Agent, or Firm* — Skaar Ulbrich Macari, P.A.

(57) ABSTRACT

A management server and a management method thereof are provided. The management server is connected to a switch on a trunk port. The switch is connected to a plurality of cloud appliances in different virtual local area networks (VLANs). The management severs operates a management system and a translation system for managing cloud appliances. The translation system is operated to modify the receiving data packet by converting the source MAC address or the source IP address and removing the VLAN tag, and to modify the transmitting data packet by converting the destination MAC address or the destination IP address and adding a VLAN tag.

16 Claims, 3 Drawing Sheets

MANAGEMENT SERVER AND MANAGEMENT METHOD THEREOF FOR MANAGING CLOUD APPLIANCES IN VIRTUAL LOCAL AREA NETWORKS

FIELD

The present invention relates to a management server and a management method thereof. More particularly, the management server of the present invention operates a translation system to modify data packets transferred from/to a switch connected to a plurality of cloud appliances in different virtual local area networks (VLANs) to manage the cloud appliances.

BACKGROUND

With the enormous development in the field of computer network and mobile technologies, people are able to access their applications, resources and services with cloud appliances via the Internet. In the hosted private cloud (HPC) market, several cloud appliances can be deployed, managed and monitored by a hosting service provider. The multi-tenant private cloud appliances may be deployed to different virtual local area networks (VLANs) for consideration of security and network management since the different VLANs are separate and independent. As a result, in the VLAN environment, each client can only control his cloud appliance via a center appliance in the same VLAN.

However, due to this restriction of the VLAN configuration, the cloud appliances in different VLAN could not be served and managed by the same management server. For example, the cloud appliances can only get their internet protocol (IP) addresses from the management server providing the Dynamic Host Configuration Protocol (DHCP) service in the same VLAN of the cloud appliances. Under this circumstance, the hosting service provider should use different management servers to manage the cloud appliances in the different VLANs. As the amount of VLANs increases, the amount of required management servers also increases. Consequently, the hosting service provider should spend more money and human resources on maintaining the management servers.

In view of this, an urgent need exists in the art is to provide a solution capable of reducing the number of the management servers required to manage the cloud appliances in the different VLANs to save the money and human resources on maintaining the management servers.

SUMMARY

A primary objective of certain embodiments of the invention is to provide a translation mechanism to modify the data packets transferred between a management server and a switch connected to a plurality of cloud appliances in the different virtual local area networks (VLANs). By using this translation mechanism, the management server is capable of managing the cloud appliances in the different VLANs. Therefore, the number of management servers required to manage the cloud appliances in the different VLANs could be reduced and then the money and human resources on maintaining the management servers could be saved.

To achieve the aforesaid objective, certain embodiments of the present invention disclose a management server for managing cloud appliances in VLANs. The management server comprises a network interface, a storage and a processing unit. The network interface is connected to a switch on a trunk port. The storage is configured to store a translation mapping table. The processing unit is electrically connected to the network interface and the storage and configured to receive a first external data packet with a none source internet protocol (IP) address, an external source media access control (MAC) address and a VLAN tag from the switch via the network interface. The processing unit operates a management system and a translation system. The translation system is operated to modify the first external data packet to generate a first internal data packet for the management system by replacing the external source MAC address with an internal source MAC address and removing the VLAN tag according to the translation mapping table. The management system is operated to generate a second internal data packet with a broadcast destination IP address and an internal destination MAC address. The translation system is further operated to modify the second internal data packet to generate a second external data packet by replacing the internal destination MAC address with an external destination MAC address and adding the VLAN tag according to the translation mapping table. The processing unit further transmits the second external data packet to the switch via the network interface In addition, certain embodiments of the present invention further disclose a management method for use in a management server for managing cloud appliances in VLANs. The management server comprises a network interface, a storage and a processing unit. The network interface is connected to a switch on a trunk port. The storage stores a translation mapping table. The processing unit is electrically connected to both the network interface and the storage and operates a management system and a translation system. The management method is executed by the processing unit and comprises the following steps: (a) receiving a first external data packet with a none source IP address, an external source MAC address and a VLAN tag from the switch via the network interface; (b) operating the translation system to modify the first external data packet to generate a first internal data packet for the management system by replacing the external source MAC address with an internal source MAC address and removing the VLAN tag according to the translation mapping table; (c) operating the management system to generate a second internal data packet with a broadcast destination IP address and an internal destination MAC address; (d) operating the translation system to modify the second internal data packet to generate a second external data packet by replacing the internal destination MAC address with an external destination MAC address and adding the VLAN tag according to the translation mapping table; and (e) transmitting the second external data packet to the switch via the network interface.

To achieve the aforesaid objective, certain embodiments of the present invention further disclose a management server for managing cloud appliances in VLANs. The management server comprises a network interface, a storage and a processing unit. The network interface is connected to a switch on a trunk port. The storage is configured to store a translation mapping table. The processing unit is electrically connected to the network interface and the storage and configured to receive a first external data packet with an external source IP address and a VLAN tag from the switch via the network interface. The processing unit operates a management system and a translation system. The translation system is operated to modify the first external data packet to generate a first internal data packet for the management system by replacing the external source IP address with an internal source IP address and removing the VLAN tag according to the translation mapping table. The management system is operated to generate a second internal data packet with an internal destination IP address. The translation system is further operated to modify the second internal data packet to generate a second external data packet by replacing the internal destination IP address with an external destination IP address and adding the VLAN tag according to the translation mapping table. The processing unit further transmits the second external data packet to the switch via the network interface.

In addition, certain embodiments of the present invention further disclose a management method for use in a management server for managing cloud appliances in VLANs. The management server comprises a network interface, a storage and a processing unit. The network interface is connected to a switch on a trunk port. The storage stores a translation mapping table. The processing unit is electrically connected to both the network interface and storage and operates a management system and a translation system. The management method is executed by the processing unit and comprises the following steps: (a) receiving a first external data packet with an external source IP address and a VLAN tag from the switch via the network interface; (b) operating the translation system to modify the first external data packet to generate a first internal data packet for the management system by replacing the external source IP address with an internal source IP address and removing the VLAN tag according to the translation mapping table; (c) operating the management system to generate a second internal data packet with an internal destination IP address; (d) operating the translation system to modify the second internal data packet to generate a second external data packet by replacing the internal destination IP address with an external destination IP address and adding the VLAN tag according to the translation mapping table; and (e) transmitting the second external data packet to the switch via the network interface.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. However, these example embodiments are not intended to limit the present invention to any specific environment, example, embodiment, applications or particular implementations described in these embodiments. Therefore, the description of these embodiments is only for the purpose of illustration rather than to limit the present invention. In the following embodiments and attached drawings, elements not directly related to the present invention are omitted from depiction; and the dimensional relationships among individual elements in the attached drawings are illustrated only for ease of understanding, but not to limit the actual scale.

Figure 1:
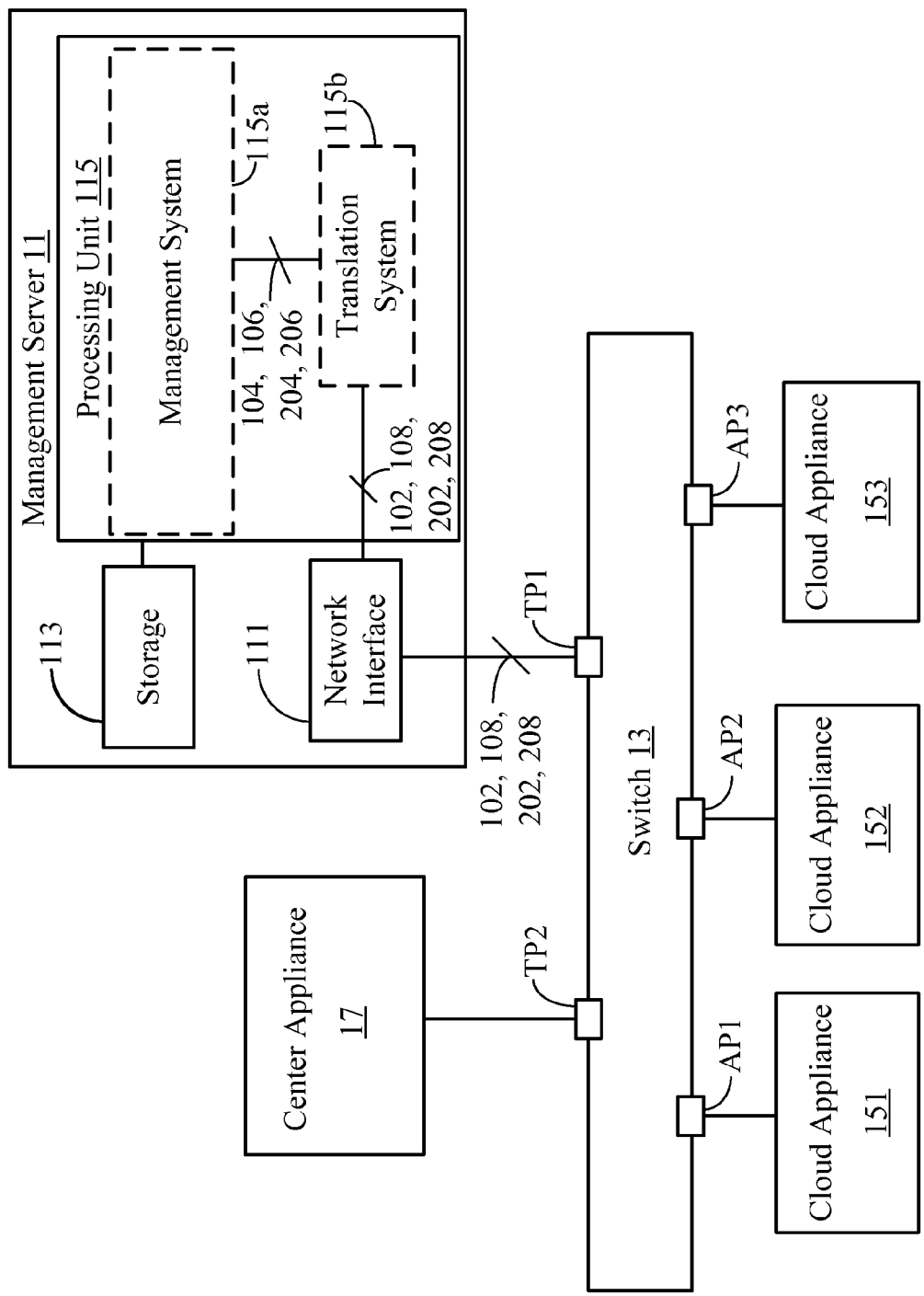
FIG. 1 depicts a schematic view of a management server 11 of the present invention, which is connected to a switch 13.

The first embodiment of the present invention is depicted in FIG. 1, which illustrates a management server 11 connected to a switch 13. The management server 11 comprises a network interface 111, a storage 113 and a processing unit 115. The network interface 111 is connected to the switch 13 on a trunk port TP1. The storage 113 stores a translation mapping table. The storage may be a tangible machine-readable medium or a combination of multiple tangible machine-readable medium for providing the management server with a permanent storage, such as a flash memory, a hard disk, or any other storage media with the same function and is well known to those skilled in the art. The processing unit 115 is electrically connected to the network interface 111 and the storage 113. The processing unit 115 operates a management system 115a and a translation system 115b.

The management system 115a is operated to manage the cloud appliances 151, 152, 153 which are connected to the switch 13 on access ports AP1, AP2 and AP3, respectively. In this embodiment, the cloud appliances 151, 152, 153 belong to different virtual local area networks (VLANs), e.g. a VLAN 1, a VLAN 2 and a VLAN 3, respectively. Each of the cloud appliances 151, 152, 153 could be controlled by a control center virtual machine (VM) operated on a center appliance 17 which is also connected to the switch 13 on a trunk port TP2 and belong to the same VLAN. For example, the cloud appliance 151 is deployed to the VLAN 1 and controlled by the control center VM which is also deployed to the VLAN 1, the cloud appliance 152 is deployed to the VLAN 2 and controlled by the control center VM which is also deployed to the VLAN 2, and the cloud appliance 153 is deployed to the VLAN 3 and controlled by the control center VM which is also deployed to the VLAN 3.

The management system is capable of providing a plurality of services including (but not limited to) a DHCP service, a monitoring service, a log collecting service and a messaging service. The translation mapping table is created to map the external source MAC addresses to the internal source MAC addresses for the receiving data packets, especially based on different VLAN tags of the receiving data packets, and map the internal destination MAC addresses to external destination MAC addresses for the transmitting data packets, especially based on different VLAN tags of the transmitting data packets.

For example, when the cloud appliance 151 would like to get its IP addresses from the management server 11, the cloud appliance 151 generates and transmits a DHCP discover data packet with a none source internet protocol (IP) address (i.e. "0.0.0.0") and an external source media access control (MAC) address (e.g. "00:0A:02:0B:03:0C", which is the MAC address of the cloud appliance 151) to the switch 13. The switch 13 generates a first external data packet 102 by adding a VLAN tag (e.g. "11" representing VLAN 1) to the DHCP discover data packet and transmits first external data packet 102 to the management server 11.

After the processing unit 115 receives the first external data packet 102 with the none source internet protocol (IP) address (i.e. "0.0.0.0"), the external source MAC address (i.e. "00:0A:02:0B:03:0C") and the VLAN tag (i.e. "11") from the switch 13 via the network interface 111, the translation system 115b is operated to modify the first external data packet 102 to generate a first internal data packet 104 for the management system 115a by replacing the external source MAC address (i.e. "00:0A:02:0B:03:0C") with an internal source MAC address (e.g. "11:11:11:0B:03:0C") and removing the VLAN tag according to the translation mapping table. Therefore, the management system 115a processes the first internal data packet 104 with the none source IP address (i.e. "0.0.0.0") and the internal source MAC address (i.e. "11:11:11:0B:03:0C").

Afterwards, the management system 115a is operated to generate a second internal data packet 106 (e.g. a DHCP offer data packet, which is generated in response to the DHCP discover data packet) with a broadcast destination IP address (i.e. "255.255.255.255) and an internal destination MAC address (i.e. "11:11:11:0B:03:0C"). The translation system 115b is further operated to modify the second internal data packet 106 to generate a second external data packet 108 by replacing the internal destination MAC address (i.e. "11:11:11:0B:03:0C") with an external destination MAC address (e.g. "00:0A:02:0B:03:0C") and adding the VLAN tag (i.e. "11") according to the translation mapping table.

Next, the processing unit 115 transmits the second external data packet 108 to the switch 13 via the network interface 111. After receiving the second external data packet 108, the switch 13 generates a DHCP offer data packet by removing the VLAN tag (i.e. "11") from the second external data packet 108 and transmits the DHCP offer data packet to the cloud appliance 151 according to the VLAN tag (i.e. "11").

According to the translation mechanism of the present invention, the cloud appliances deployed to the different VLANs can get their IP addresses from the management server 11. In addition, even though two appliances deployed to the different VLAN have the same MAC address, their MAC addresses will convert to different MAC address based on the different VLAN tags to prevent a MAC address conflict. For example, the MAC address e.g. "00:0A:02:0B:03:0C" in the data packet with the VLAN tag "12" will convert to "12:12:12:0B:03:0C".

It should be noted that in this embodiment, the translation mapping table indicates converting the organizationally unique identifier (OUI) of the source MAC address of a receiving data packet and converting the OUI of the destination MAC address of a transmitting data packet. In other words, the external source MAC address and the internal source MAC address have different organizationally unique identifiers (OUIs) but have a same unique serial number, and the internal destination MAC address and the external destination MAC address have different OUIs but a same unique serial number.

However, the present invention does not limit this mapping rule. In another embodiment, the translation mapping table indicates converting the source MAC address (including both the OUI and the unique serial number) of a receiving data packet and converting the destination MAC address (including both the OUI and the unique serial number) of a transmitting data packet. It is believed that a person having ordinary skill in the art will appreciate how to modify the translation mapping table to achieve the objective of the present invention based on the above explanation; thus, it will not be further described herein.

Furthermore, for purpose of simplicity, the other information included in the first external data packet 102 and the first internal data packet 104, such as the destination MAC address (e.g. "FF:FF:FF:FF:FF:FF", which is the broadcast MAC address), and the other information included in the second internal data packet 106 and the second external data packet 108, such as the source MAC address (e.g. "A1:2B:C3:4D:E5:6F", which is the MAC address of the management server 11), have been omitted from description herein.

The second embodiment of the present invention is also depicted in FIG. 1. In this embodiment, the translation mapping table is further created to map the external source IP addresses to the internal source IP addresses for the receiving data packets, especially based on different VLAN tags of the receiving data packets, and map the internal destination IP addresses to external destination IP addresses for the transmitting data packets, especially based on different VLAN tags of the transmitting data packets.

For example, when the cloud appliance 152 would like to communicate with the management server 11, the cloud appliance 152 generates and transmits a data packet with an external source IP address (e.g. "140.92.24.99/16", which is the IP address of the cloud appliance 152) to the switch 13. The switch 13 generates a first external data packet 202 by adding a VLAN tag (e.g. "12" representing VLAN 2) to the data packet and transmits first external data packet 202 to the management server 11.

After the processing unit 115 receives the first external data packet 202 with the external source IP address (i.e. "140.92.24.99/16") and the VLAN tag (i.e. "12") from the switch 13 via the network interface 111, the translation system 115b is operated to modify the first external data packet 202 to generate a first internal data packet 204 for the management system 115a by replacing the external source IP address (i.e. "140.92.24.99/16") with an internal source IP address (e.g. "10.12.24.99/16") and removing the VLAN tag according to the translation mapping table. Therefore, the management system 115a processes the first internal data packet 204 with the internal source IP address (e.g. "10.12.24.99/16").

Afterwards, the management system 115a may be operated to generate a second internal data packet 206 with an internal destination IP address (i.e. "10.12.24.99/16") for the cloud appliance 152. The translation system 115b is further operated to modify the second internal data packet 206 to generate a second external data packet 208 by replacing the internal destination IP address (i.e. "10.12.24.99/16") with an external destination IP address (e.g. "140.92.24.99/16") and adding the VLAN tag (i.e. "12") according to the translation mapping table.

Next, the processing unit 115 transmits the second external data packet 208 to the switch 13 via the network interface 111. After receiving the second external data packet 208, the switch 13 generates a data packet by removing the VLAN tag (i.e. "12") from the second external data packet 208 and transmits the data packet to the cloud appliance 152 according to the VLAN tag (i.e. "12").

According to the translation mechanism of the present invention, even though two appliances deployed to the different VLAN have the same IP address, their IP addresses will convert to different IP address based on different VLAN tags to prevent an IP address conflict. For example, the IP address e.g. "140.92.24.99/16" in the data packet with the VLAN tag "13" will convert to "10.13.24.99/16".

It should be noted that in this embodiment, the translation mapping table indicates converting the network address of the source IP address of a receiving data packet and converting the network address of the destination IP address of a transmitting data packet. In other words, the external source IP address and the internal source IP address have different network addresses but have a same host address, and the internal destination IP address and the external destination IP address have different network addresses but a same host address.

However, the present invention does not limit this mapping rule. In another embodiments, the translation mapping table indicates converting the source IP address (including both the network address and the host address) of a receiving data packet and converting the destination IP address (including both the network address and the host address) of a transmitting data packet. It is believed that a person having ordinary skill in the art will appreciate how to modify the translation mapping table to achieve the objective of the present invention based on the above explanation; thus, it will not be further described herein.

Furthermore, for purpose of simplicity, the other information included in the first external data packet 202 and the first internal data packet 204, such as the destination IP address (e.g. "140.92.24.99/16", which is the IP address of the management server 11), and the other information included in the second internal data packet 206 and the second external data packet 208, such as the source IP address (i.e. "140.92.24.99/16", which is the IP address of the management server 11), have been omitted from description herein.

It shall be stated that the translation mapping table of the present invention not only indicates the mapping rule, but also records (1) the relationship between the external source MAC addresses and the internal source MAC addresses, (2) the relationship between the external destination MAC addresses and the internal destination MAC addresses, the external source IP addresses and the internal source IP addresses, and (3) the relationship between the external destination IP addresses and the internal destination IP addresses, and the VLAN tags for the translation system 115b to process the receiving data packets and the transmitting data packets.

If a receiving data packet has the none source IP address (i.e. "0.0.0.0"), the translation system 115b converts the source MAC address of the receiving data packet and writes the relationship between the source MAC addresses of the original receiving data packet and the converted receiving data packet and the VLAN tag of the original receiving data packet into the translation mapping table. Based on the record, if a transmitting data packet has the broadcast destination IP address (i.e. "255.255.255.255) and the destination MAC address same to the source MAC address of the original receiving data packet, the translation system 115b converts the destination MAC address of the transmitting data packet and adds the VLAN tag according to the translation mapping table.

In other situations, if a receiving data packet has a specific source IP address rather than the none source IP address (i.e. "0.0.0.0"), the translation system 115b converts the source IP address of the receiving data packet and writes the relationship between the source IP addresses of the original receiving data packet and the converted receiving data packet and the VLAN tag of the original receiving data packet into the translation mapping table. Based on the record, if a transmitting data packet has the destination IP address same to the source IP address of the original receiving data packet, the translation system 115b converts the destination IP address of the transmitting data packet and adds the VLAN tag according to the translation mapping table.

Besides, the management server 11 can comprise multiple network interfaces, each of which is connected to different switches. In this case, the management server 11 can also manage the appliances connected the different switches and in different VLANs based on the same translation mechanism as described above. Details associated with this case can be easily appreciated by a person having ordinary skill in the art, and are not further described herein.

Figure 2:
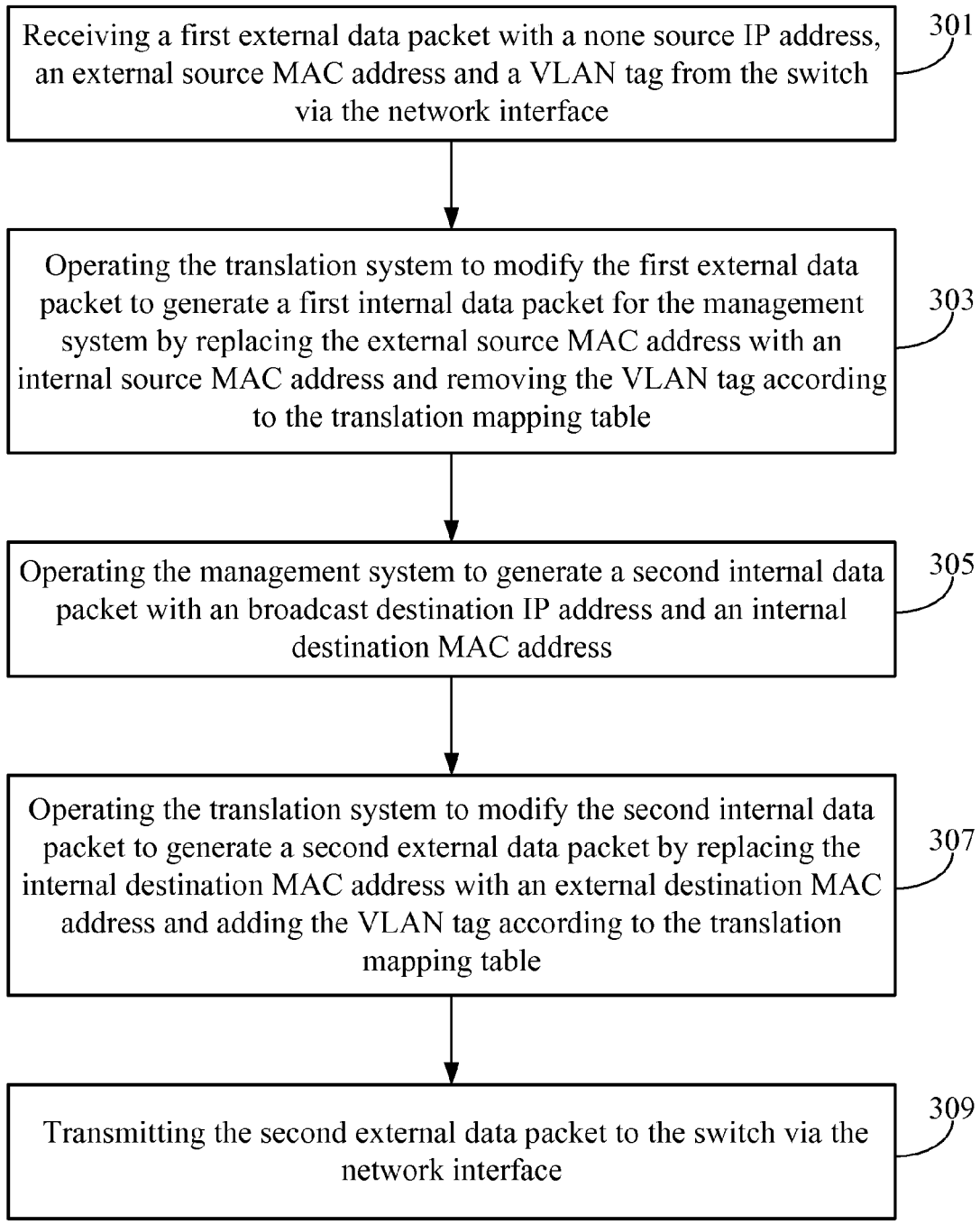
FIG. 2 is a flowchart diagram of a management method according to the third embodiment of the present invention.

The third embodiment of the present invention is a management method for use in a management server and a flowchart of which is illustrated in FIG. 2. The management method of the present invention can be adapted to be executed by the processing unit of the management server, such as the process unit 115 of the management server 11 set forth in foregoing embodiments. In addition to the processing unit, the management server has a network interface and a storage. The network interface is connected to a switch on a trunk port. The storage stores a translation mapping table. The processing unit is electrically connected to both the network interface and storage and operates a management system and a translation system.

Firstly, step 301 is executed to receive a first external data packet with a none source IP address, an external source MAC address and a VLAN tag from the switch via the network interface. Then, step 303 is executed to operate the translation system to modify the first external data packet to generate a first internal data packet for the management system by replacing the external source MAC address with an internal source MAC address and removing the VLAN tag according to the translation mapping table.

Later on, step 305 is executed to operate the management system to generate a second internal data packet with a broadcast destination IP address and an internal destination MAC address. Following that, step 307 is executed to operate the translation system to modify the second internal data packet to generate a second external data packet by replacing the internal destination MAC address with an external destination MAC address and adding the VLAN tag according to the translation mapping table. Next, step 309 is executed to transmit the second external data packet to the switch via the network interface.

In addition to the aforesaid steps, the management method of this embodiment can also execute all the operations and functions set forth in the first embodiment. The method in this embodiment executes these operations and functions will be readily appreciated by those of ordinary skill in the art based on the explanation of the first embodiment, and thus, will not be further described herein.

Figure 3:
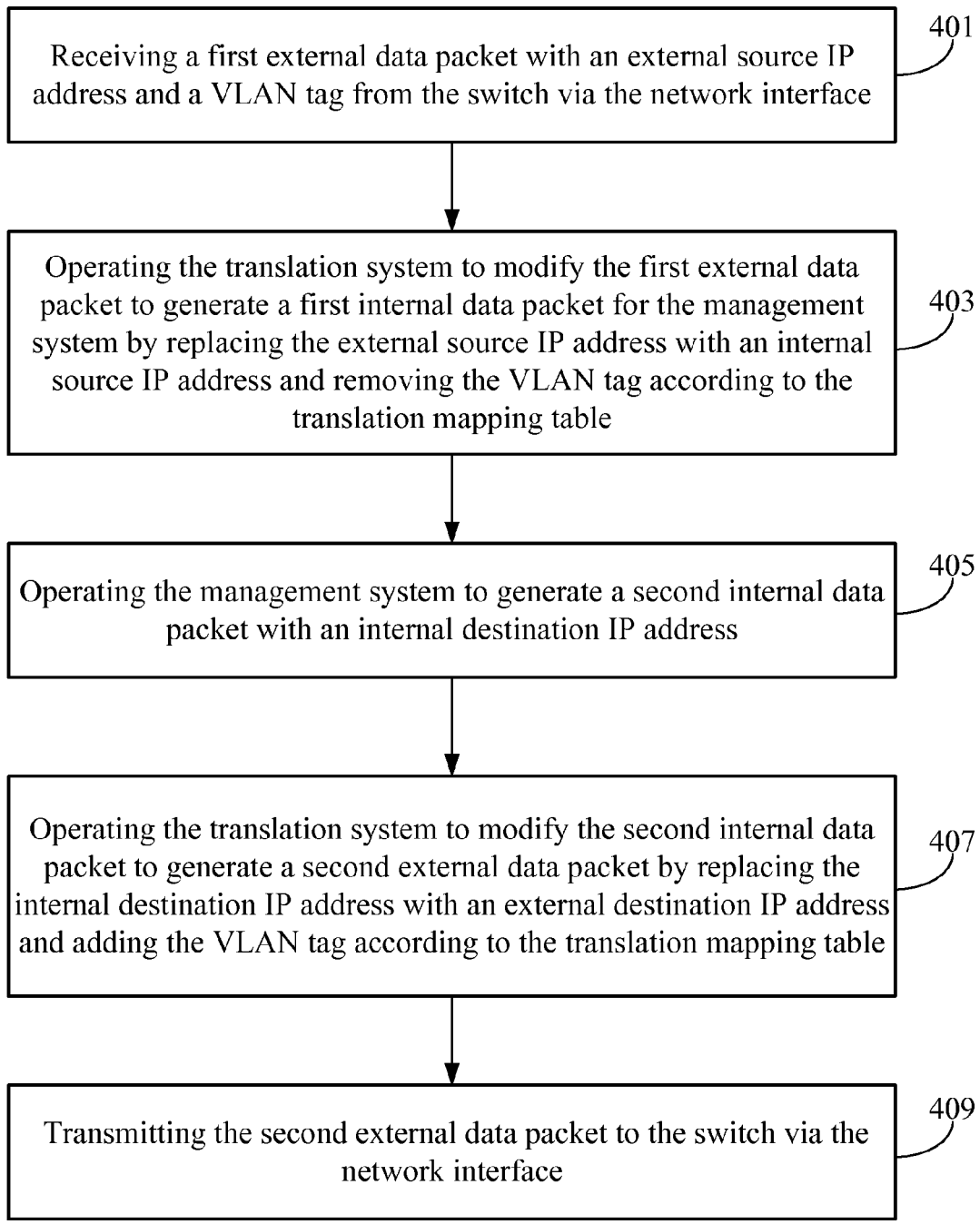
FIG. 3 is a flowchart diagram of a management method according to the fourth embodiment of the present invention.

The fourth embodiment of the present invention is a management method for use in a management server and a flowchart of which is illustrated in FIG. 3. The management method of the present invention can be adapted to be executed by the processing unit of the management server, such as the processing unit 115 of the management server 11 set forth in foregoing embodiments. In addition to the processing unit, the management server has a network interface and a storage. The network interface is connected to a switch on a trunk port. The storage stores a translation mapping table. The processing unit is electrically connected to the network interface and the storage and operates a management system and a translation system.

Firstly, step 401 is executed to receive a first external data packet with an external source IP address and a VLAN tag from the switch via the network interface. Then, step 403 is executed to operate the translation system to modify the first external data packet to generate a first internal data packet for the management system by replacing the external source IP address with an internal source IP address and removing the VLAN tag according to the translation mapping table.

Later on, step 405 is executed to operate the management system to generate a second internal data packet with an internal destination IP address. Following, step 407 is executed to operate the translation system to modify the second internal data packet to generate a second external data packet by replacing the internal destination IP address with an external destination IP address and adding the VLAN tag according to the translation mapping table. Next, step 409 is executed to transmit the second external data packet to the switch via the network interface.

In addition to the aforesaid steps, the management method of this embodiment can also execute all the operations and functions set forth in the second embodiment. The method in this embodiment executes these operations and functions will be readily appreciated by those of ordinary skill in the art based on the explanation of the second embodiment, and thus, will not be further described herein.

According to the above descriptions, the present invention provides a translation mechanism to modify the data packets transferred between a management server and a switch connected to a plurality of cloud appliances in the different virtual local area networks (VLANs). Based on the translation mechanism, the management server is capable of managing the cloud appliances in the different VLANs to significantly reduce the number of the management servers required to manage the cloud appliances in the different VLANs and consequently to save the money and human resources on maintaining the management servers.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A management server for managing cloud appliances in virtual local area networks (VLANs), comprising:
a network interface, being connected to a switch on a trunk port;
a storage, being configured to store a translation mapping table; and
a processing unit, being electrically connected to the network interface and the storage and configured to receive a first external data packet with a none source internet protocol (IP) address, an external source media access control (MAC) address and a VLAN tag from the switch via the network interface and operate:
a management system; and
a translation system to modify the first external data packet to generate a first internal data packet for the management system by replacing the external source MAC address with an internal source MAC address and removing the VLAN tag according to the translation mapping table;
wherein the management system is operated to generate a second internal data packet with a broadcast destination IP address and an internal destination MAC address, the translation system is further operated to modify the second internal data packet to generate a second external data packet by replacing the internal destination MAC address with an external destination MAC address and adding the VLAN tag according to the translation mapping table, and the processing unit further transmits the second external data packet to the switch via the network interface;
wherein the external source MAC address and the external destination MAC address are an MAC address of one of the cloud appliances, the internal source MAC address and the internal destination MAC address are an internal MAC address for the one of the cloud appliance, and the translation mapping table maps the MAC address of the one of the cloud appliance to the internal MAC address for the one of the cloud appliance.

2. The management server as claimed in claim 1, wherein the external source MAC address and the internal source MAC address have different organizationally unique identifiers (OUIs), and the internal destination MAC address and the external destination MAC address have different OUIs.

3. The management server as claimed in claim 2, wherein the external source MAC address and the internal source MAC address have a same unique serial number, and the internal destination MAC address and the external destination MAC address have a same unique serial number.

4. The management server as claimed in claim 1, wherein the cloud appliances includes multi-tenant private cloud appliances, each of the multi-tenant private cloud appliances is connected to the switch on an access port and controlled by one of a plurality of control center systems operated on a center appliance, and the center appliance is connected to the switch on a trunk port.

5. A management method for use in a management server for managing cloud appliances in VLANs, the management server comprising a network interface, a storage and a processing unit, the network interface being connected to a switch on a trunk port, the storage, storing a translation mapping table, the processing unit being electrically connected to the network interface and the storage and operating a management system and a translation system, the management method being executed by the processing unit and comprising:
(a) receiving a first external data packet with a none source internet protocol (IP) address, an external source media access control (MAC) address and a VLAN tag from the switch via the network interface;
(b) operating the translation system to modify the first external data packet to generate a first internal data packet for the management system by replacing the external source MAC address with an internal source MAC address and removing the VLAN tag according to the translation mapping table;
(c) operating the management system to generate a second internal data packet with a broadcast destination IP address and an internal destination MAC address;
(d) operating the translation system to modify the second internal data packet to generate a second external data packet by replacing the internal destination MAC address with an external destination MAC address and adding the VLAN tag according to the translation mapping table; and
(e) transmitting the second external data packet to the switch via the network interface;
wherein the external source MAC address and the external destination MAC address are an MAC address of one of the cloud appliances, the internal source MAC address and the internal destination MAC address are an internal MAC address for the one of the cloud appliance, and the translation mapping table maps the MAC address of the one of the cloud appliance to the internal MAC address for the one of the cloud appliance.

6. The management method as claimed in claim 5, wherein the external source MAC address and the internal source MAC address have different organizationally unique identifiers (OUIs), and the internal destination MAC address and the external destination MAC address have different OUIs.

7. The management method as claimed in claim 6, wherein the external source MAC address and the internal source MAC address have a same unique serial number, and the internal destination MAC address and the external destination MAC address have a same unique serial number.

8. The management method as claimed in claim 5, wherein the cloud appliances includes multi-tenant private cloud appliances, each of the multi-tenant private cloud appliances is connected to the switch on an access port and controlled by one of a plurality of control center systems operated on a center appliance, and the center appliance is connected to the switch on a trunk port.

9. A management server for managing cloud appliances in virtual local area networks (VLANs), comprising:
 a network interface, being connected to a switch on a trunk port;
 a storage, being configured to store a translation mapping table; and
 a processing unit, being electrically connected to the network interface and the storage and configured to receive a first external data packet with an external source internet protocol (IP) address and a VLAN tag from the switch via the network interface and operates:
  a management system; and
  a translation system to modify the first external data packet to generate a first internal data packet for the management system by replacing the external source IP address with an internal source IP address and removing the VLAN tag according to the translation mapping table;
 wherein the management system is operated to generate a second internal data packet with an internal destination IP address, the translation system is further operated to modify the second internal data packet to generate a second external data packet by replacing the internal destination IP address with an external destination IP address and adding the VLAN tag according to the translation mapping table, and the processing unit further transmits the second external data packet to the switch via the network interface;
 wherein the external source IP address and the external destination IP address are an IP address of one of the cloud appliances, the internal source IP address and the internal destination IP address are an internal IP address for the one of the cloud appliance, and the translation mapping table maps the IP address of the one of the cloud appliance to the internal IP address for the one of the cloud appliance.

10. The management server as claimed in claim 9, wherein the external source IP address and the internal source IP address have different network addresses, and the internal destination IP address and the external destination IP address have different network addresses.

11. The management server as claimed in claim 10, wherein the external source IP address and the internal source IP address have a same host address, and the internal destination IP address and the external destination IP address have a same host addresses.

12. The management server as claimed in claim 9, wherein the cloud appliances includes multi-tenant private cloud appliances, each of the multi-tenant private cloud appliances is connected to the switch on an access port and controlled by one of a plurality of control center systems operated on a center appliance, and the center appliance is connected to the switch on a trunk port.

13. A management method for use in a management server for managing cloud appliances in VLANs, the management server comprising a network interface, a storage and a processing unit, the network interface being connected to a switch on a trunk port, the storage storing a translation mapping table, the processing unit being electrically connected to the network interface and the storage and operating a management system and a translation system, the management method being executed by the processing unit and comprising:
 (a) receiving a first external data packet with an external source internet protocol (IP) address and a VLAN tag from the switch via the network interface;
 (b) operating the translation system to modify the first external data packet to generate a first internal data packet for the management system by replacing the external source IP address with an internal source IP address and removing the VLAN tag according to the translation mapping table;
 (c) operating the management system to generate a second internal data packet with an internal destination IP address;
 (d) operating the translation system to modify the second internal data packet to generate a second external data packet by replacing the internal destination IP address with an external destination IP address and adding the VLAN tag according to the translation mapping table; and
 (e) transmitting the second external data packet to the switch via the network interface;
 wherein the external source IP address and the external destination IP address are an IP address of one of the cloud appliances, the internal source IP address and the internal destination IP address are an internal IP address for the one of the cloud appliance, and the translation mapping table maps the IP address of the one of the cloud appliance to the internal IP address for the one of the cloud appliance.

14. The management method as claimed in claim 13, wherein the external source IP address and the internal source IP address have different network addresses, and the internal destination IP address and the external destination IP address have different network addresses.

15. The management method as claimed in claim 14, wherein the external source IP address and the internal source IP address have a same host address, and the internal destination IP address and the external destination IP address have a same host address.

16. The management method as claimed in claim 13, wherein the cloud appliances includes multi-tenant private cloud appliances, each of the multi-tenant private cloud appliances is connected to the switch on an access port and controlled by one of a plurality of control center systems operated on a center appliance, and the center appliance is connected to the switch on a trunk port.

* * * * *